(12) United States Patent
Odenwelder et al.

(10) Patent No.: US 10,582,747 B1
(45) Date of Patent: Mar. 10, 2020

(54) MULTIPLE TEMPERATURE STORAGE ASSEMBLY

(71) Applicants: Phillip Odenwelder, Nazareth, PA (US); Judy Novak, Nazareth, PA (US)

(72) Inventors: Phillip Odenwelder, Nazareth, PA (US); Judy Novak, Nazareth, PA (US)

( * ) Notice: Subject to any disclaimer, the term of this patent is extended or adjusted under 35 U.S.C. 154(b) by 0 days.

(21) Appl. No.: 16/150,393

(22) Filed: Oct. 3, 2018

(51) Int. Cl.
*A45C 11/20* (2006.01)
*A45C 5/08* (2006.01)
*B65D 81/38* (2006.01)
*A45F 3/46* (2006.01)

(52) U.S. Cl.
CPC ............... *A45C 11/20* (2013.01); *A45C 5/08* (2013.01); *A45C 2200/20* (2013.01); *A45F 3/46* (2013.01); *B65D 81/3837* (2013.01); *B65D 81/3881* (2013.01)

(58) Field of Classification Search
CPC .. B65D 81/3838; B65D 81/3881; A45C 5/08; A45C 11/20; A45C 2200/20; A45F 3/46
USPC ............................... 206/545; 62/457.3–457.5
See application file for complete search history.

(56) References Cited

U.S. PATENT DOCUMENTS

| | | | |
|---|---|---|---|
| 2,057,933 A * | 10/1936 | Brinkman | ................. A45F 3/02 206/541 |
| 3,071,282 A | 1/1963 | Walters | |
| 3,128,812 A * | 4/1964 | Scheurer | ............... A63B 55/408 206/315.4 |
| 3,263,806 A * | 8/1966 | Ring | ................... B65D 83/0038 206/427 |
| 3,565,277 A | 2/1971 | Sewitch | |
| 4,516,409 A | 5/1985 | Hobbs | |
| D283,758 S | 5/1986 | Stewart | |
| 4,910,977 A | 3/1990 | Hilton | |
| 5,269,156 A * | 12/1993 | van de Velde | ............ F25D 3/08 62/371 |
| 7,100,397 B1 * | 9/2006 | Gratteau | ................... F25D 3/08 62/457.5 |
| 8,985,330 B1 * | 3/2015 | Normand | ............... B65D 85/72 206/427 |
| 9,648,933 B2 * | 5/2017 | Munoz | ................... A45C 15/00 |

* cited by examiner

*Primary Examiner* — Luan K Bui

(57) ABSTRACT

A multiple temperature storage assembly includes a sleeve that has an opening therein for accessing an interior of the sleeve and to receive food items for storage. The sleeve is comprised of a thermally insulating material to retain the food items at a selected temperature. A door is hingedly coupled to the sleeve for opening and closing the opening. A disk is slidably positioned within the sleeve such that the disk defines an upper section of the sleeve and a lower section of the sleeve. The disk is comprised of a thermally insulating material to inhibit thermal communication between the upper and lower sections. Thus, each of the upper and lower sections can store a respective one of warm food items and cold food items. A tube is slidably coupled to the sleeve. The tube has a chamber therein that is fluidly discrete from the sleeve when the tube is slidably coupled to the sleeve for storing dry objects.

7 Claims, 4 Drawing Sheets

MULTIPLE TEMPERATURE STORAGE ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cooler devices and more particularly pertains to a new cooler device for carrying a plurality of cylindrical beverage containers of varying temperatures.

BRIEF SUMMARY OF THE INVENTION

An embodiment of the disclosure meets the needs presented above by generally comprising a sleeve that has an opening therein for accessing an interior of the sleeve and to receive food items for storage. The sleeve is comprised of a thermally insulating material to retain the food items at a selected temperature. A door is hingedly coupled to the sleeve for opening and closing the opening. A disk is slidably positioned within the sleeve such that the disk defines an upper section of the sleeve and a lower section of the sleeve. The disk is comprised of a thermally insulating material to inhibit thermal communication between the upper and lower sections. Thus, each of the upper and lower sections can store a respective one of warm food items and cold food items. A tube is slidably coupled to the sleeve. The tube has a chamber therein that is fluidly discrete from the sleeve when the tube is slidably coupled to the sleeve for storing dry objects.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
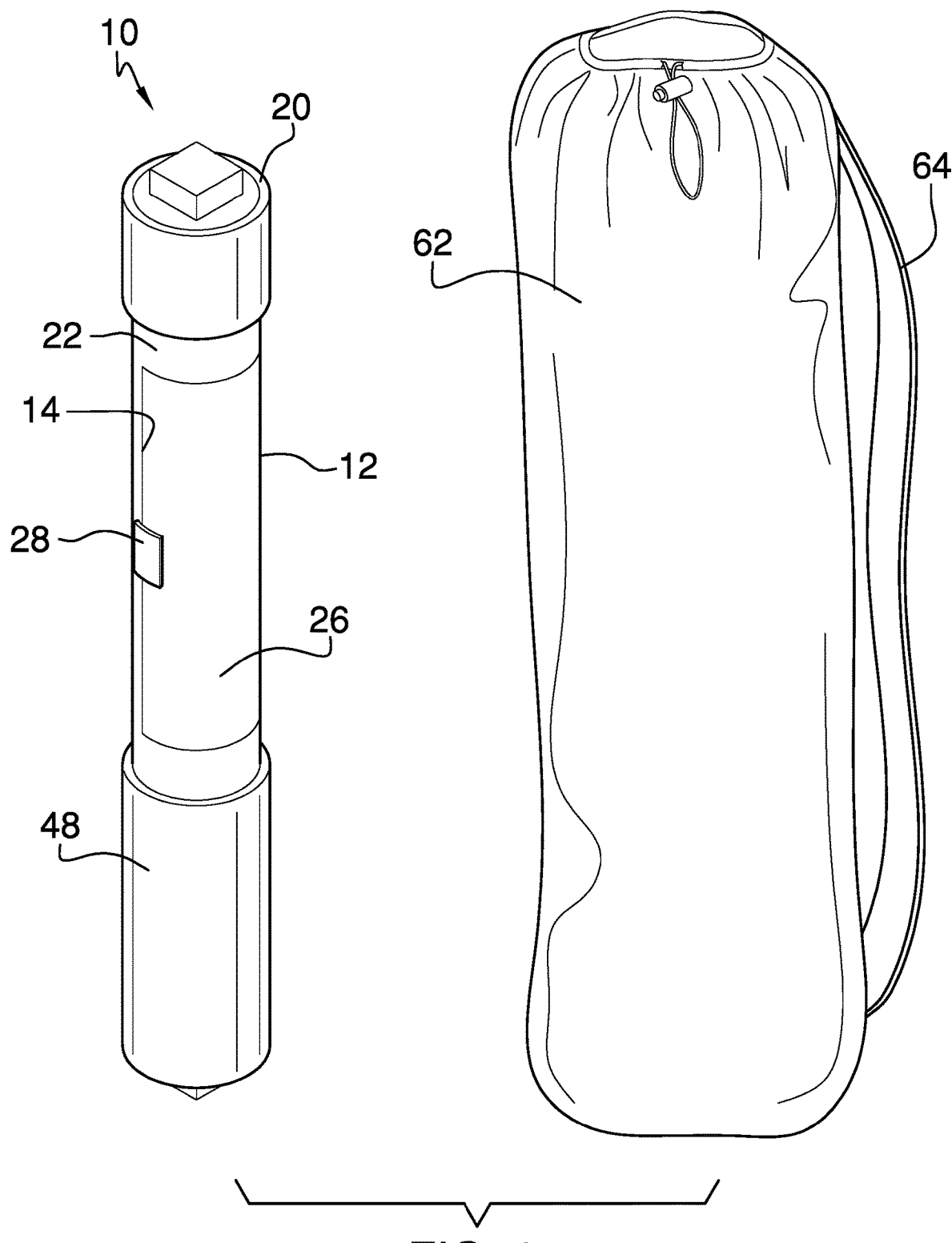
FIG. 1 is a perspective view of a multiple temperature storage assembly according to an embodiment of the disclosure.
Figure 3:
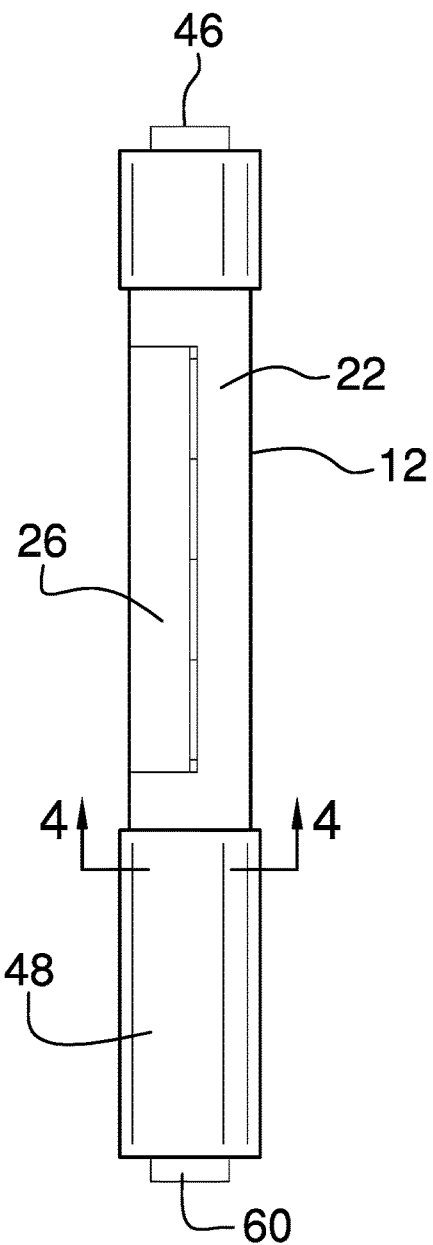
FIG. 3 is a right side view of an embodiment of the disclosure.
Figure 2:
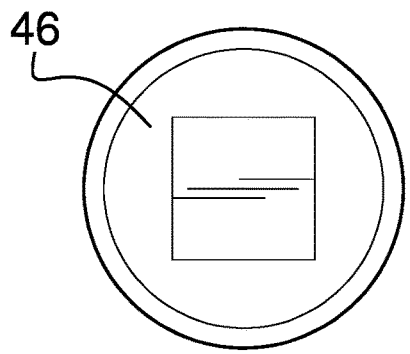
FIG. 2 is a top view of an embodiment of the disclosure.
Figure 4:
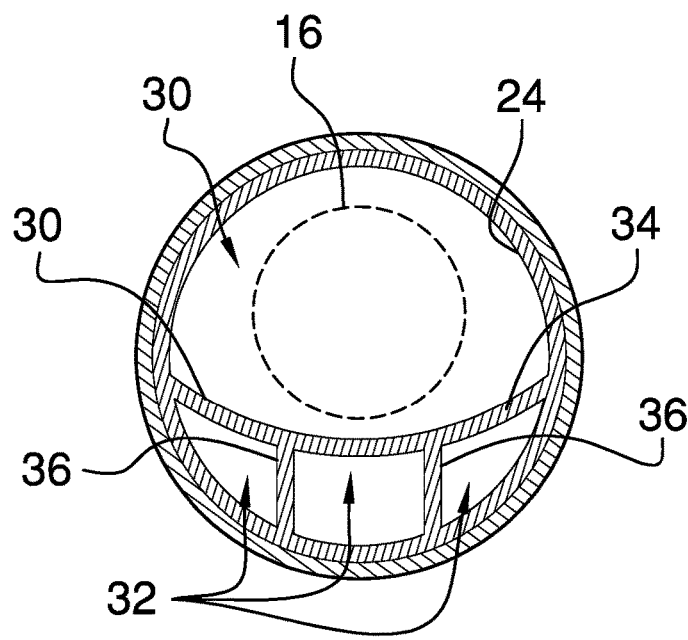
FIG. 4 is a cross sectional view taken along line 4-4 of FIG. 3 of an embodiment of the disclosure.
Figure 5:
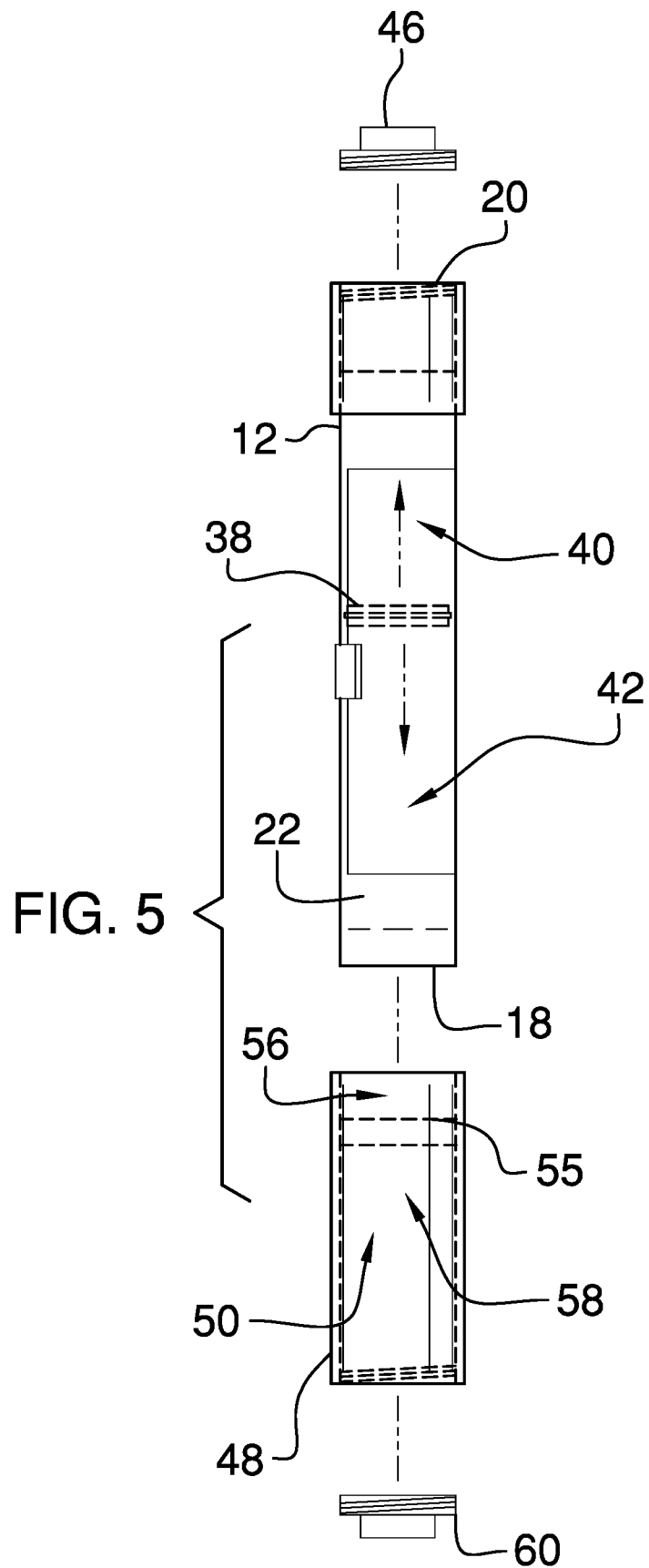
FIG. 5 is an exploded phantom view of an embodiment of the disclosure.
Figure 6:
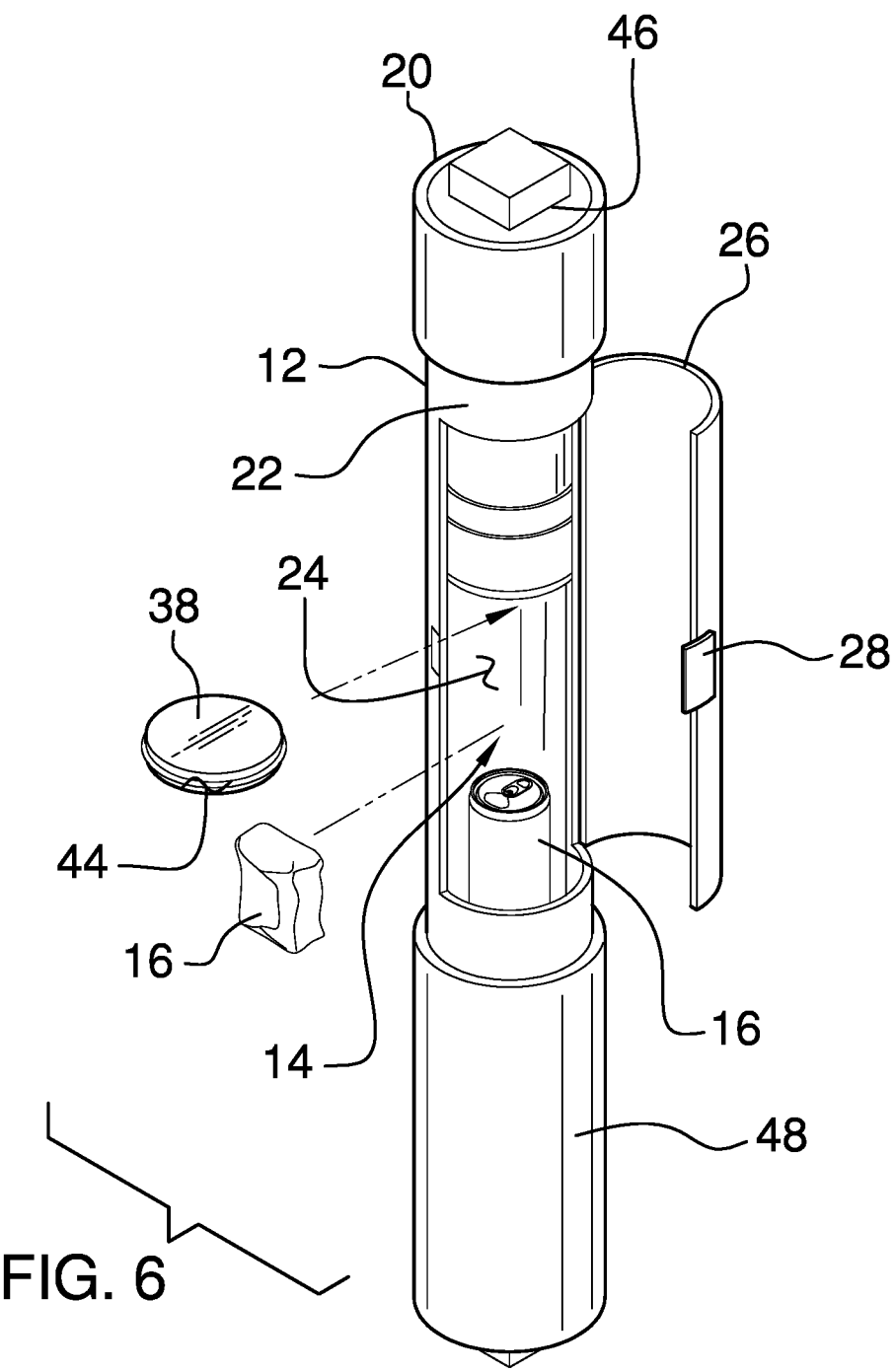
FIG. 6 is a perspective in-use view of an embodiment of the disclosure.

With reference now to the drawings, and in particular to FIGS. 1 through 6 thereof, a new cooler device embodying the principles and concepts of an embodiment of the disclosure and generally designated by the reference numeral 10 will be described.

As best illustrated in FIGS. 1 through 6, the multiple temperature storage assembly 10 generally comprises a sleeve 12 that has an opening 14 therein for accessing an interior of the sleeve 12. The opening 14 may receive food items 16 for storing the food items 16 within the sleeve 12. The sleeve 12 is comprised of a thermally insulating material to retain the food items 16 at a selected temperature. In this way the food items 16 can be transported in the convention of a cooler.

The sleeve 12 has a first end 18, a second end 20 and an outer wall 22 extending therebetween, and each of the first 18 and second 20 ends is open. The opening 14 extends through the outer wall 22 and the outer wall 22 has an inside surface 24. A door 26 is hingedly coupled to the sleeve 12 and the door 26 is aligned with the opening 14 for opening 14 and closing the opening 14. Additionally, the door 26 is curved such that the door 26 conforms to a curvature of the outer wall 22 of the sleeve 12 when the door 26 is closed. A lock 28 is coupled to the door 26 and the lock 28 releasably engaging the outer wall 22 of the sleeve 12 when the door 26 is closed to inhibit the door 26 from opening 14. The lock 28 may be a mechanical lock 28 of any conventional design.

A divider 30 is positioned within the sleeve 12 to define a plurality of chambers 32 in the sleeve 12. The divider 30 may include a front wall 34 extending across the sleeve 12 and a plurality of sidewalls 36 each extending between the front wall 34 and the inside surface 24 of the outer wall 22 of the sleeve 12. The divider 30 extends from the second end 20 toward the first end 18 and each of the chambers 32 receives ice for cooling the interior of the sleeve 12.

A disk 38 is slidably positioned within the sleeve 12 such that the disk 38 defines an upper section 40 of the sleeve 12 and a lower section 42 of the sleeve 12. The disk 38 is comprised of a thermally insulating material to inhibit thermal communication between the upper 40 and lower 42 sections. In this way each of the upper 40 and lower 42 sections can store a respective one of warm food items 16 and cold food items 16. More specifically, the lower section 42 is in thermal communication with the chambers 32 in the sleeve 12 thereby facilitating the lower section 42 to store cool food items 16. The disk 38 has an outer surface 44 and the outer surface 44 engages the inside surface 24 of the outer wall 22 of the sleeve 12. Moreover, the outer surface 44 forms a fluid impermeable seal with the inside surface 24.

A top cap 46 is removably coupled to the first end 18 of the sleeve 12 for closing the first end 18. A tube 48 is slidably coupled to the sleeve 12. The tube 48 has a chamber 50 therein that is fluidly discrete from the sleeve 12 when the tube 48 is slidably coupled to the sleeve 12. Thus, the tube 48 can store dry objects. The tube 48 has an upper end 52 and a lower end 54. A divider 55 is positioned within the tube 48 such that the divider 30 forms a first space 56 and a second space 58 in the tube 48. The first space 56 has the upper end 52 associated therewith and the second space 58 has the lower end 54 associated therewith. The first space 56 insertably receives the second end 20 of the sleeve 12 having the second end 20 of the sleeve 12 abutting the divider 30.

A bottom cap 60 is removably coupled to the lower end 54 of the tube 48 for closing the lower end 54. A bag 62 is provided and the bag 62 is elongated thereby facilitating the sleeve 12 and the tube 48 to be positionable therein for transportation. The bag 62 is comprised of a thermally insulating material and the bag 62 may have a drawstring or the like for closing the bag 62. A shoulder strap 64 is coupled to the bag 62 for carrying the bag 62 over a shoulder.

In use, the chambers 32 in the sleeve 12 are filled with ice and the second end 20 of the sleeve 12 is slid into the first space 56 in the tube 48. The door 26 on the sleeve 12 is opened and the cool food items 16, such as beverage containers or the like, are inserted into the sleeve 12 for cold storage. The disk 38 is positioned in the sleeve 12 such that the disk 38 rests on the cool food items 16 thereby facilitating warm food items 16 to be stored between the disk 38 and the second end 20 of the sleeve 12. In this way the sleeve 12 can store warm and cool food items 16 with minimum thermal communication between the warm and cool food items 16. The bottom cap 60 is removed from the tube 48 for storing dry items, such as napkins, spices or other dry items within the tube 48. The sleeve 12 and the tube 48 are positioned in the bag 62 and the bag 62 is carried over the shoulder. In this way beverage containers and other food items 16 can be carried hands free into music festivals or other outdoor 26 activities. Additionally, the sleeve 12 facilitates cool beverage storage without requiring a bulky cooler to be transported.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A multiple temperature storage assembly being configured to simultaneously contain hot and cold items, said assembly comprising:
    a sleeve having an opening therein for accessing an interior of said sleeve wherein said opening is configured to receive food items for storage, said sleeve being comprised of a thermally insulating material wherein said sleeve is configured to retain the food items at a selected temperature;
    a door being hingedly coupled to said sleeve, said door being aligned with said opening for opening and closing said opening;
    a disk being slidably positioned within said sleeve such that said disk defines an upper section of said sleeve and a lower section of said sleeve, said disk being comprised of a thermally insulating material to inhibit thermal communication between said upper and lower sections wherein each of said upper and lower sections is configured to store a respective one of warm food items and cold food items;
    a tube being slidably coupled to said sleeve, said tube having a chamber therein being fluidly discrete from said sleeve when said tube is slidably coupled to said sleeve wherein said tube is configured to store dry objects.

2. The assembly according to claim 1, wherein:
    said sleeve has a first end, a second end and an outer wall extending therebetween, each of said first and second ends being open, said opening extending through said outer wall, said outer wall having an inside surface;
    said door is curved such that said door conforms to a curvature of said outer wall of said sleeve when said door is closed; and
    said disk has an outer surface, said outer surface engaging said inside surface of said outer wall of said sleeve, said outer surface forming a fluid impermeable seal with said inside surface.

3. The assembly according to claim 2, further comprising a divider being positioned within said sleeve to define a plurality of chambers in said sleeve, said divider extending from said second end toward said first end, each of said chambers receiving ice for cooling an interior of said sleeve.

4. The assembly according to claim 2, further comprising:
    a top cap being removably coupled to said first end of said sleeve for closing said first end; and
    a bottom cap being removably coupled to said lower end of said tube for closing said lower end.

5. The assembly according to claim 2, further comprising:
    said tube having an upper end and a lower end; and
    a divider being positioned within said tube such that said divider forms a first space and a second space in said tube, said first space having said upper end being associated therewith, said second space having said lower end being associated therewith, said first space insertably receiving said second end of said sleeve having said second end abutting said divider.

6. The assembly according to claim 1, further comprising:

a bag having said sleeve and said tube being positionable therein for transportation, said bag being comprised of a thermally insulating material; and a shoulder strap being coupled to said bag wherein said shoulder strap is configured to be positioned over a shoulder for carrying said bag.

7. A multiple temperature storage assembly being configured to simultaneously contain hot and cold items, said assembly comprising:

a sleeve having an opening therein for accessing an interior of said sleeve wherein said opening is configured to receive food items for storage, said sleeve being comprised of a thermally insulating material wherein said sleeve is configured to retain the food items at a selected temperature, said sleeve having a first end, a second end and an outer wall extending therebetween, each of said first and second ends being open, said opening extending through said outer wall, said outer wall having an inside surface;

a door being hingedly coupled to said sleeve, said door being aligned with said opening for opening and closing said opening, said door being curved such that said door conforms to a curvature of said outer wall of said sleeve when said door is closed;

a lock being coupled to said door, said lock releasably engaging said outer wall of said sleeve when said door is closed to inhibit said door from opening;

a divider being positioned within said sleeve to define a plurality of chambers in said sleeve, said divider extending from said second end toward said first end, each of said chambers receiving ice for cooling an interior of said sleeve;

a disk being slidably positioned within said sleeve such that said disk defines an upper section of said sleeve and a lower section of said sleeve, said disk being comprised of a thermally insulating material to inhibit thermal communication between said upper and lower sections wherein each of said upper and lower sections is configured to store a respective one of warm food items and cold food items, said disk having an outer surface, said outer surface engaging said inside surface of said outer wall of said sleeve, said outer surface forming a fluid impermeable seal with said inside surface;

a top cap being removably coupled to said first end of said sleeve for closing said first end;

a tube being slidably coupled to said sleeve, said tube having a chamber therein being fluidly discrete from said sleeve when said tube is slidably coupled to said sleeve wherein said tube is configured to store dry objects, said tube having an upper end and a lower end;

a divider being positioned within said tube such that said divider forms a first space and a second space in said tube, said first space having said upper end being associated therewith, said second space having said lower end being associated therewith, said first space insertably receiving said second end of said sleeve having said second end abutting said divider;

a bottom cap being removably coupled to said lower end of said tube for closing said lower end; and a bag having said sleeve and said tube being positionable therein for transportation, said bag being comprised of a thermally insulating material; and a shoulder strap being coupled to said bag wherein said shoulder strap is configured to be positioned over a shoulder for carrying said bag.

* * * * *